Oct. 19, 1948.  F. M. AIMES  2,451,706
DRIVE CONTROL FOR AIR POWERED APPARATUS
Filed Nov. 20, 1943
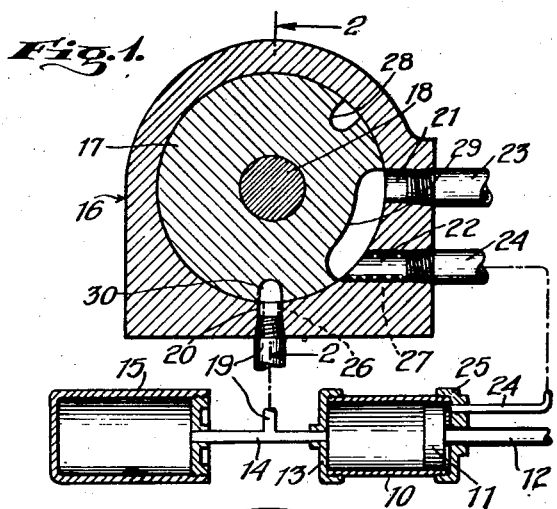
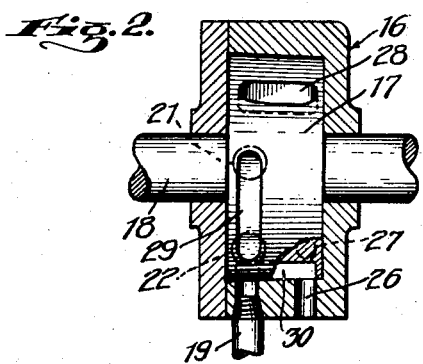
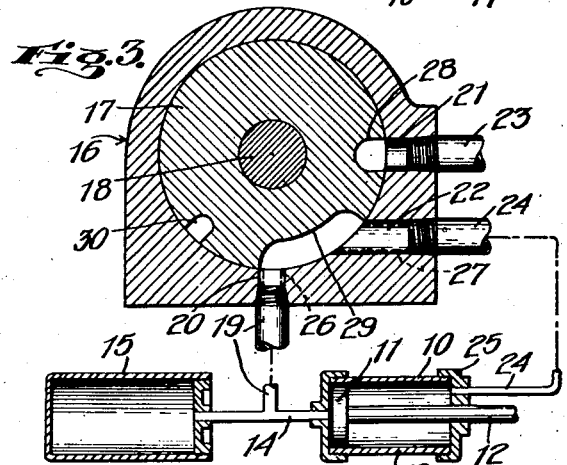
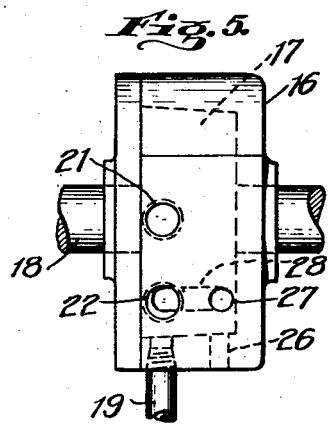
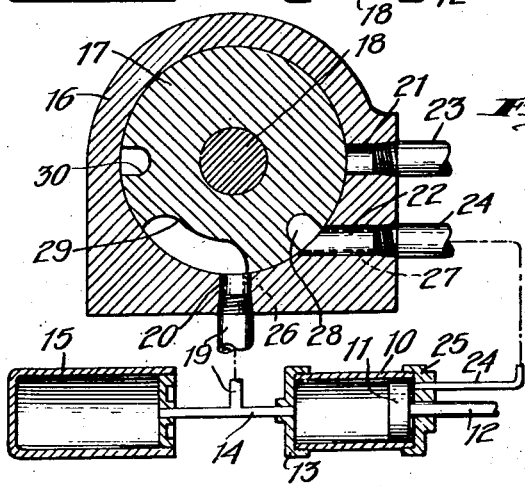
INVENTOR
FRANCIS M. AIMES
BY
ATTORNEY Patented Oct. 19, 1948

2,451,706

UNITED STATES PATENT OFFICE 2,451,706

DRIVE CONTROL FOR AIR POWERED APPARATUS

Francis M. Aimes, Yonkers, N. Y.

Application November 20, 1943, Serial No. 511,163

5 Claims. (Cl. 121—38)

1

This invention relates to apparatus driven through the medium of compressed air. More particularly, the invention relates to a valve for controlling transmission of air to the apparatus in the initial drive thereof, and in utilizing the expanded air for operating the apparatus in the return or idle stroke in economizing on the operation of air powered apparatus of the kind under consideration. The novel features of the invention will be best understood from the following description when taken together with the accompanying drawing, in which certain embodiments of the invention are disclosed, and in which the separate parts are designated by suitable reference characters in each of the views, and in which:

Fig. 1 is a diagrammatic view showing on a very much reduced scale the drive cylinder of an apparatus and the control therefor in position to initially drive the piston in the air cylinder.

Fig. 2 is a partial section on the line 2—2 of Fig. 1, showing part of the valve in elevation and in section.

Fig. 3 is a view similar to Fig. 1, showing the parts in a different position.

Fig. 4 is a view similar to Fig. 3, showing the parts in a still further different position; and Fig. 5 is a face view of the valve with the valve in a position as seen in Fig. 4, and omitting part of the construction.

In various types and kinds of air powered apparatus, and particularly in driving pistons in a cylinder by compressed air, it has been a common practice to exhaust or waste this air in the return or idle stroke of the piston, and it is the purpose of my invention to utilize this expanded air as a means for operating the piston in its return or idle stroke, thereby providing a highly efficient operation of air powered apparatus of the kind under consideration.

In the accompanying drawing is shown diagrammatically, one adaptation of the invention. In the several figures, 10 represents on a very much reduced scale a cylinder in which is mounted a piston 11, from which extends a shaft 12 to be coupled with an apparatus of any type or kind to be driven. Coupled with the end 13 of the cylinder 10 is a pipe 14, which is also coupled with one end of an expansion chamber 15, thus placing the cylinder 10 in direct communication with said chamber. At 16 is shown a valve casing in which is mounted a rotatable valve 17, which preferably has a slightly tapered seat in the casing 16, as will clearly appear in Fig. 2 of the drawing.

The valve 17 has a suitable shaft 18, by means of which this valve may be manually or mechanically and automatically operated in bringing the valve into the several positions illustrated in Figs. 1, 3 and 4.

2

On the casing 16 is a pipe 19, which is coupled with and in communication with the pipe 14, and the pipe 19 opens into the valve casing through a port 20. In the casing 16 are two other ports 21 and 22, with which are connected respectively, a compressed air supply pipe 23, and a discharge pipe 24. The pipe 23 is coupled with a suitable source of compressed air supply, whereas the pipe 24 communicates with and opens into the end 25 of the cylinder 10.

In the valve casing 16 are two exhaust ports 26 and 27, through which air may be exhausted to atmosphere, as will later appear.

In the peripheral surface of the valve 17 are arranged three ports 28, 29 and 30. The ports 28 and 30 extending longitudinally across the surface of the valve 17, whereas the port 29 extends longitudinally of the circumference of the valve, as will clearly appear from a consideration of Figs. 1 and 2 of the drawing.

In the operation of the apparatus, the valve 17 is moved from a position shown in Fig. 4 to the position shown in Fig. 1, at which time, air under pressure in the pipe 23 will pass through the port 29 into the port 22, out through the pipe 24, and into the end 25 of the cylinder 10, thus driving the piston 11 in the direction of the end 13 of the cylinder. The result of which operation is indicated in Fig. 3 of the drawing. During this operation, air is discharged from the cylinder 10 through the pipe 19, port 20, port or passage 30, and out through the exhaust 26. Immediately on completion of the above operation, the valve 17 is rotated into the position shown in Fig. 3, which cuts off the supply of air to the pipe 24, and the port or passage 29 places the port 22 in communication with the port 20. In this position, the compressed air in the cylinder 10 will be exhausted through the pipe 24, and into the expansion cylinder or chamber 15 through the pipes 19 and 14. At the completion of this operation, a balance of air pressure will be established on both sides of the piston 11, that is to say, in the chamber 15 and in the cylinder 10. Thereafter the valve 17 is then moved into the position shown in Fig. 4, in which position the port or passage 28 places the port 22 in communication with the exhaust passage 27, thus exhausting the air from the cylinder 10 through the pipe 24, as will be apparent. In this operation, the sealed compressed air in the chamber 15 will pass through the pipe 14 into the end 13 of the cylinder, and thus drive the piston 11 to the end 25 of the cylinder. The result of which operation is indicated in Fig. 4 of the drawing. From this position the cycle of operation is repeated by again returning the valve 17 to the position shown in Fig. 1.

From the foregoing, it will be apparent that the port or passage 29 of the valve 17 registers solely with the ports 20, 21 and 22, whereas the port or passage 28 is adapted to register with the ports 22—27 and the port or passage 30 with the ports 20 and 26.

As will be apparent, the control system is specifically illustrated, and as described, can be used wherever the two phase operation of an air driven member or apparatus is desired. In all instances, the initial compressed air forced into a cylinder under a predetermined high pressure is then by-passed into a storage cylinder or chamber, which forms an auxiliary or supplemental supply of compressed air at a lower pressure than the initial driving pressure, and then in utilizing this low pressure air as a means for returning the driven member to its normal position.

Having fully described my invention, what I claim as new and desire to secure by Letters Patent is:

1. A drive control for air powered apparatus comprising in combination with a cylinder and a piston mounted for reciprocation in the cylinder, of a control valve and low pressure storage chamber, said chamber comprising a member arranged beyond the bounds of piston travel in said cylinder and spaced with respect to said valve, means placing one end of said cylinder in communication with said chamber, said valve having means controlling supply of air under high pressure to the other end of said cylinder in moving the piston to the first named end of the cylinder in the power stroke of said piston, means including the first named means and said valve for discharging air to atmosphere from the first named end of the cylinder in the power stroke of said piston, said valve in another position thereof having means for transmitting high pressure air introduced into the second named end of the cylinder to the first named means and said storage chamber, and means in another position of said valve for exhausting air to atmosphere from the second named end of the cylinder and simultaneously utilizing the air in said storage chamber to move the piston from the first named end to the second named end of said cylinder.

2. A drive control for air powered apparatus comprising in combination with a cylinder and a piston mounted for reciprocation in the cylinder, of a control valve and low pressure storage chamber, said chamber comprising a member arranged beyond the bounds of piston travel in said cylinder and spaced with respect to said valve, means placing one end of said cylinder in communication with said chamber, said valve having means controlling supply of air under high pressure to the other end of said cylinder in moving the piston to the first named end of the cylinder in the power stroke of said piston, means including the first named means and said valve for discharging air to atmosphere from the first named end of the cylinder in the power stroke of said piston, said valve in another position thereof having means for transmitting high pressure air introduced into the second named end of the cylinder to the first named means and said storage chamber, means in another position of said valve for exhausting air to atmosphere from the second named end of the cylinder and simultaneously utilizing the air in said storage chamber to move the piston from the first named end to the second named end of said cylinder, said valve comprising a rotary valve element, the exhaust means of said element comprising spaced transverse passages in the periphery thereof, and the means controlling high pressure air supply to the cylinder and storage chamber comprising a circumferentially elongated passage on the periphery of said valve element.

3. The combination with a cylinder and a piston movable in the cylinder, of means comprising a single valve for supplying air under pressure to one end of the cylinder for operating the piston therein in one direction in the power stroke of the piston, said valve having means for exhausting air to atmosphere from the other end of the cylinder during the power stroke of said piston, a compressed air storage chamber arranged beyond the bounds of piston travel in said cylinder and in communication with the last named end of the cylinder, said valve having means for exhausting the air from the first named end of the cylinder to said storage chamber to balance the pressure of air at both sides of the piston in said cylinder, and said valve having means to then exhaust the air from the first named end of the cylinder to atmosphere thereby moving the piston to the first named end of the cylinder by the air from said storage chamber.

4. The combination with a cylinder having a piston movable in one direction in the cylinder in a power stroke and in the opposite direction in a return stroke, of a storage chamber arranged in spaced relation to the cylinder, means comprising a valve which in one position is adapted to supply air under pressure to one end of the cylinder for operating the piston in the power stroke thereof, means in another position of the valve whereby air introduced into the cylinder through the first named end thereof can be discharged and stored in said chamber, means in still another position of said valve for exhausting the air from the first named end of the cylinder to atmosphere and simultaneously introducing stored air from said chamber into the other end of the cylinder to operate the piston in the return stroke thereof, and means in the first named position of said valve for exhausting air from the second named end of the cylinder to atmosphere in the power stroke of the piston in said cylinder.

5. The combination with an apparatus employing a piston driven in a cylinder in the power stroke of the apparatus by air under high pressure introduced into one end of the cylinder, a storage chamber spaced with respect to said cylinder and of a capacity substantially equal to the capacity of said cylinder, means comprising a unitary rotatable valve movable into different positions for transmitting the air introduced into the first named end of the cylinder to said storage chamber in one position of said valve and then in another position of said valve to transmit air from the first named end of the cylinder into the other end of the cylinder and to said storage chamber to drive the piston in the opposite direction in said cylinder, and means including said valve in another position thereof for exhausting air from the cylinder to atmosphere in both movements of the piston in the cylinder.

FRANCIS M. AIMES.

REFERENCES CITED

The following references are of record in the file of this patent:

UNITED STATES PATENTS

| Number | Name | Date |
| --- | --- | --- |
| 112,385 | Sellers | Mar. 7, 1871 |
| 226,218 | Wilson | Apr. 6, 1880 |
| 937,384 | Osmer | Oct. 19, 1909 |
| 1,441,088 | Hofstetter | Jan. 2, 1923 |